Jan. 24, 1961 C. A. L. RUHL ET AL 2,969,089
CONTROL VALVE
Filed March 16, 1959 2 Sheets-Sheet 1

INVENTOR
Charles A. L. Ruhl
and Robert C. Westveer
BY
Dodge and Sons
ATTORNEYS

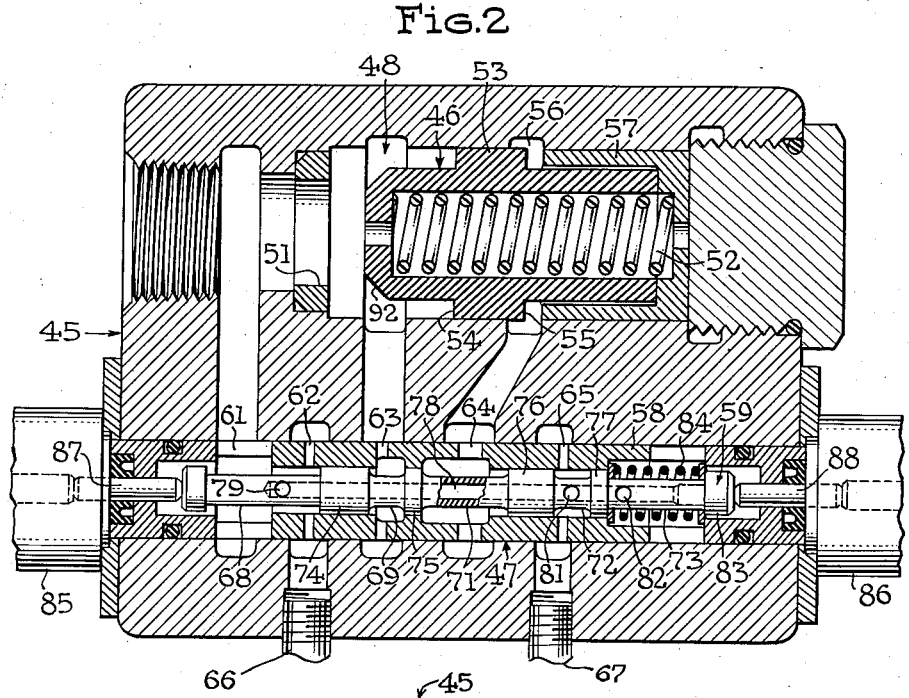
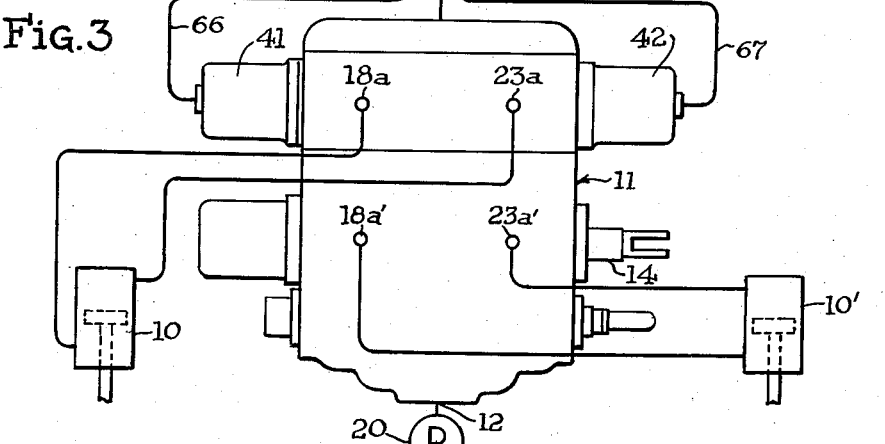

United States Patent Office 2,969,089
Patented Jan. 24, 1961

2,969,089

CONTROL VALVE

Charles A. L. Ruhl and Robert C. Westveer, Kalamazoo, Mich., assignors to The New York Air Brake Company, a corporation of New Jersey Filed Mar. 16, 1959, Ser. No. 799,720

3 Claims. (Cl. 137—620)

This invention relates to control valves for double-acting motors and, more particularly, to pilot-operated control valves of the open-center type. As used herein, the term "three-position open-center control valve" means a valve having inlet and exhaust ports, two motor ports, and a movable valve member which has a neutral position in which the inlet and exhaust ports are connected and is shiftable in one direction from the neutral position to interrupt this connection and connect the inlet port with one motor port and the exhaust port with the other motor port, and shiftable in the opposite direction from the neutral position to reverse the connections between the inlet and exhaust ports and the two motor ports.

In valves of this type, the movable member is usually connected with a centering spring which biases it toward the neutral position, and with a pair of opposed piloted-pressure motors which shift it in opposite directions from that position against the bias of the centering spring when the pressures in their working chambers are unbalanced. Two types of piloting mechanism can be used to operate the piloted motors; in one type the working chambers of both motors are normally pressurized and are selectively vented, and in the other these chambers are normally vented and are selectively pressurized. It has been the practice, in both types of mechanism, to derive the operating pressure from the fluid which flows through the open-center path in the control valve. This was accomplished by inserting in this path a fixed restriction which produced a back pressure sufficient to cause shifting of the movable valve member against the bias of the centering spring. While this arrangement is operable, it is undesirable because the restriction imposes a load on the pump whenever the valve member is in its neutral position. Since this member frequently is in that position for long periods of time, the scheme is wasteful of energy.

The object of this invention is to provide a pilot-operated control valve in which the piloting pressure is derived from the fluid flowing through the control valve but in which the load imposed on the pump is materially reduced during the time the movable valve member is in its neutral position. This is accomplished by employing a variable restriction in the open-center path; the back pressure created by this restriction being increased to the level necessary to operate the piloted motors by the piloting mechanism only when shifting of the valve member is desired. During periods of inactivity, the variable restriction assumes a position in which the back pressure imposed on the pump is a minimum and is considerably less than that which is required to operate the piloted pressure motors.

The preferred embodiment of the invention will now be described in detail with reference to the accompanying drawings, in which:

Fig. 2 is an enlarged sectional view taken on line 2—2 of Fig. 1.

Fig. 3 is a schematic diagram of the system in which the invention is used.

Figure 1:
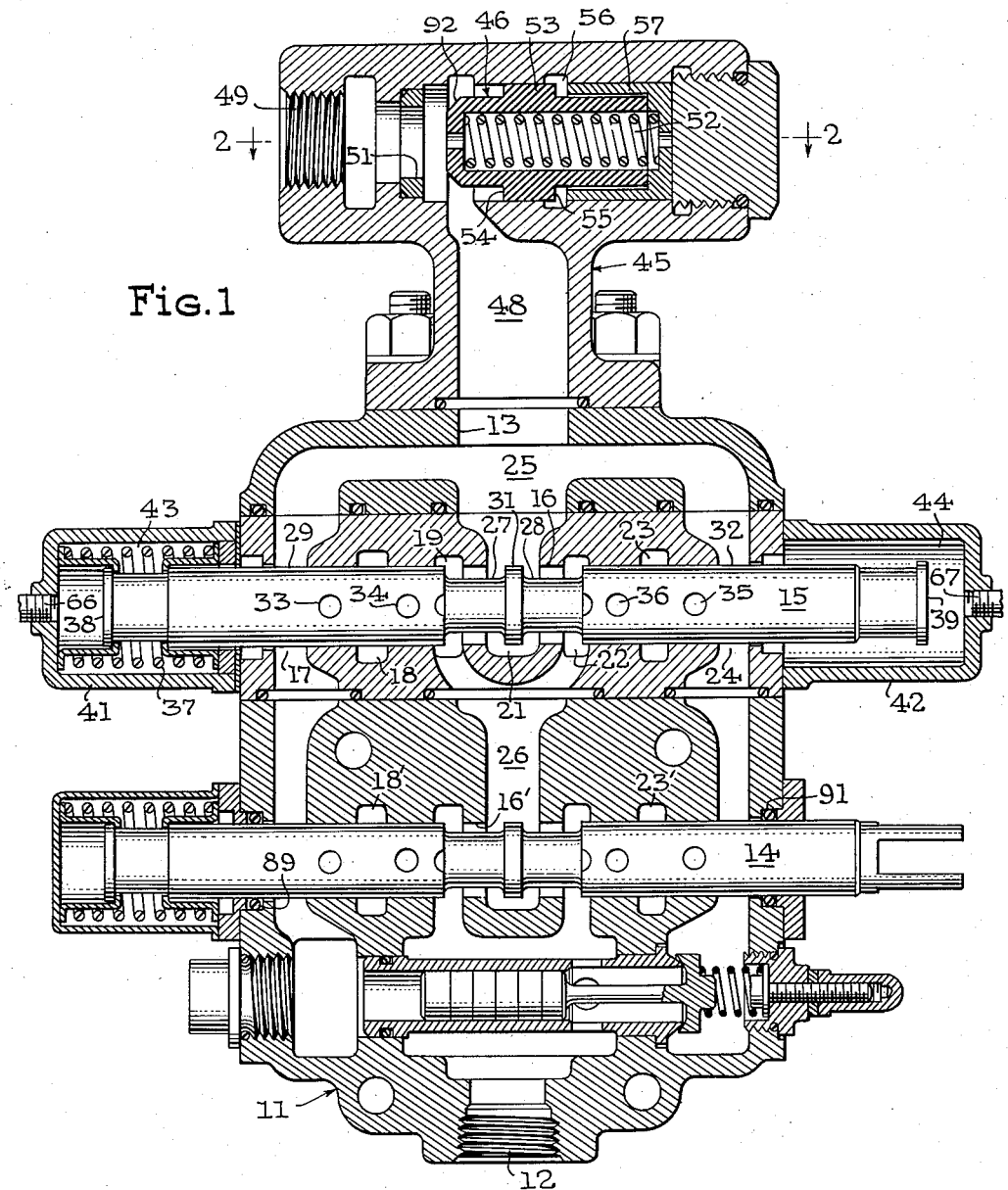
Fig. 1 is a sectional view of a dual plunger open-center control valve incorporating the invention.

The control valve 11, shown in Fig. 1, is of the conventional open-center series-parallel type having inlet and outlet ports 12 and 13 and employing two hollow control plungers 14 and 15. These plungers are identical except for the fact that plunger 14 is manually operated and plunger 15 is pilot operated. Because of this, only the plunger 15 and its associated chambers will be described in detail.

Plunger 15 is received in a through bore 16 formed in the housing and encircled by seven spaced annular chambers 17, 18, 19, 21, 22, 23 and 24. The chambers 17, 21 and 24 are connected with the outlet port 13 by an exhaust manifold 25, and the chambers 19 and 22 are connected with inlet port 12 by supply passage 26. The annular chambers 18 and 23 communicate with motor ports 18a and 23a, respectively, which are connected to opposite sides of the double-acting motor 10 which is to be controlled.

The hollow plunger 15 is of the type described and claimed in Stephens Patent 2,362,944, issued November 14, 1944, and includes two annular grooves 27 and 28 which define three spaced valve lands 29, 31 and 32. The land 29 contains two sets of radial passages 33, 34 which are interconnected by an internal bore (not shown). As explained in the Stephens patent mentioned above, flow through this bore is controlled by a check valve. Passages 33 and 34 are so located that when the plunger 15 is in its neutral position, land 29 isolates chamber 18 from chambers 17 and 19. When the plunger 15 is moved to the right from the neutral position, the passages 33 and 34 interconnect chambers 18 and 19, and when the plunger is moved to the left from neutral, these passages interconnect chambers 17 and 18. Land 32 is formed with similar sets of passages 35 and 36; these passages serving to selectively connect chamber 23 with chambers 24 and 22.

Plunger 15 is provided, at its left end, with a centering spring 37 which biases it to the neutral position. The opposite ends 38, 39 of the plunger are enclosed by caps 41 and 42, and these ends serve as the pistons of the piloted pressure motors which shift the plunger against the bias of centering spring 37. The sealed spaces 43 and 44, within caps 41 and 42, respectively, are the working chambers of these motors.

Bolted to the top of the control valve 11 (as viewed in Fig. 1) is a housing 45 containing an unloading valve 46 and the pilot valve 47. The unloading valve 46 is located in a passage 48 which leads from outlet port 13 to exhaust port 49 and is biased toward its seat 51 by a spring 52. This valve is provided with an enlarged diameter central portions 53 which defines opposed shoulders 54 and 55 that are subject to the pressures in that portion of passage 48 upstream of the unloading valve and annular chamber 56, respectively. The radial clearance between unloading valve 46 and sleeve 57 (which is exaggerated in Figs. 1 and 2) is sufficient to permit a restricted flow of fluid from annular chamber 56 to exhaust port 49 through the central bore formed in the unloading valve 46 and through passage 48.

The pilot valve 47 comprises a ported sleeve 58 which is pressed into a bore formed in housing 45, and piloting plunger 59. The sleeve 58 is formed with five sets of ports 61, 62, 63, 64 and 65; the ports 61 and 63 communicating with the passage 48 at points downstream and upstream, respectively, of unloading valve 46, the port 64 communicating with the annular chamber 56, and the ports 62 and 65 communicating with the working chambers 43 and 44 of the piloted pressure motors via lines 66 and 67. The piloting plunger 59 is formed with five spaced annular grooves 68, 69, 71, 72 and 73 that define the four valve lands 74, 75, 76 and 77. An axial bore 78 is formed in the plunger 59 and is intersected by three sets of spaced radial passages 79, 81 and 82. The open right end of bore 78 is sealed by the plug 83. The plunger 59 is biased to the position shown in Fig. 2 by a centering spring 84 and is shifted in opposite directions from this position by solenoids 85 and 86 whose armatures act on the pins 87 and 88 that abut the opposite ends of the plunger 59.

It should be observed that the O-ring seals 89 and 91 located at the opposite ends of bore 16' have been omitted from the bore 16 and that, therefore, fluid in manifold 25 may leak through the radial clearance between plunger 15 and bore 16 (which is exaggerated in Fig. 1) into the working chambers 43 and 44 of the piloted-pressure motors. The significance of these restricted flow paths between manifold 25 and the working chambers will be apparent from the following description of operation.

*Operation*

As shown in Fig. 3, inlet port 12 and exhaust port 49 are connected with pump 20 and sump 30, respectively, and the motor ports 18a, 23a, 18a' and 23a' communicating with chambers 18 and 23 and 18' and 23' are connected to the opposite sides of the two double-acting motors 10 and 10' which are being controlled. When the solenoids 85 and 86 are de-energized, centering spring 84 shifts the piloting plunger 59 to the position shown in Fig. 2, thereby causing the working chambers 43 and 44 of the two piloted motors to be vented. The vent path for working chamber 43 comprises line 66, port 62, plunger groove 68, port 61, passage 48 and exhaust port 49, and the vent path for working chamber 44 comprises line 67, port 65, radial passages 81, axial bore 78, radial passages 79, port 61, passage 48 and exhaust port 49. Since the pressures in the working chambers 43 and 44 are now equal, centering spring 37 shifts plunger 15 to its neutral position with the result that fluid entering inlet port 12 will be conveyed to the sump 30 along the open-center unloading path comprising supply passage 26, manifold 25, outlet port 13, passage 48, and exhaust port 49.

When the piloting plunger 59 is in its neutral position, the port 64 in sleeve 58 is isolated from the other ports by lands 75 and 76, and since chamber 56 is in communication with exhaust port 49 (through the clearance between unloading valve 46 and the sleeve 57 and the axial bore formed in this valve), the pressure in chamber 56 will be equal to the pressure in port 49. Because of this and the fact that the fluid pressure in passage 48 upstream of seat 51 acts on nose 92 and shoulder 54, the unloading valve 46 will shift to the maximum open position (shown in the drawings) against the bias of spring 52. As a result, the unloading flow through the open-center path will occur at minimum back pressure and the load on the pump 20 will be small.

The solenoid 86 is energized in order to shift plunger 15 to the right for the purpose of pressurizing and venting the motor ports 18a and 23a, respectively. This action shifts piloting plunger 59 to the left causing land 74 to interrupt the vent path between piloted motor working chamber 43 and exhaust port 49, and also causing groove 71 to interconnect ports 63 and 64. Fluid is now transmitted from that portion of passage 48 upstream of the unloading valve 46 to chamber 56 thus substantially equalizing the pressures acting on opposed shoulders 54 and 55. Valve 46 now shifts to the left to increase the back pressure in passage 48. The valve 46 will not close completely but will take up a position in which the increased back pressure acting on nose 92 produces a force that balances the force exerted by spring 52. Spring 52 is so selected that this increased back pressure is sufficient to operate the piloted motors against the bias of centering spring 37.

The rise in back pressure in passage 48 is effective in manifold 25 to force fluid through the radial clearance between plunger 15 and bore 16 into the working chambers 43 and 44. The fluid which enters working chamber 44 is returned to sump 30 through the vent path previously described (this path remaining open when solenoid 86 is energized) without producing any substantial change in pressure in that chamber. However, the fluid which enters working chamber 43 cannot escape because land 74 of the piloting plunger 59 has overtravelled the port 62 and consequently the pressure in this working chamber will rise to the value established by unloading valve 46. Since the areas of plunger ends 38 and 39 are equal, the pressure differential between working chambers 43 and 44 is effective to shift plunger 15 to the right against the bias of centering spring 37 to a position in which passages 33 and 34 interconnect chambers 18 and 19, passages 35 and 36 interconnect chambers 23 and 24, and lands 29 and 31 interrupt flow from supply passage 26 to outlet port 13. As a result of this shift, the fluid delivered to inlet port 12 by the pump 20 is transmitted to one side of the double-acting controlled motor 10 through chamber 18 and port 18a, and the fluid returned from the opposite side of this motor passes to the sump 30 through port 23a, chamber 23, manifold 25, outlet port 13, passage 48 and exhaust port 49. Although the open-center path is interrupted by lands 29 and 31, this has no effect on the operation of the piloted motors because the return flow from the controlled motor 10 maintains the back pressure in manifold 25 and thus ensures that the plunger 15 will stay in its new position.

It is important to note here that the small radial clearance between the plunger 15 and its bore 16 forms a restriction in each of the flow paths which pass through the working chambers 43 and 44 and connect the manifold 25 with the exhaust port 49. If these flow paths established free communication between manifold 25 and exhaust port 49, then unloading valve 46 would be ineffective to vary the back pressure in passage 48.

When solenoid 86 is de-energized, centering spring 84 shifts the piloting plunger back to its Fig. 2 position, thereby reopening the vent path from working chamber 43 to exhaust port 49, and causing the pressure in working chamber 43 to decrease. When the pressures in the working chambers 43 and 44 are again equal, centering spring 37 will have shifted plunger 15 back to its neutral position. Concurrently with the re-opening of the vent passage from working chamber 43, the piloting plunger interrupts flow to chamber 56 through groove 71. The pressure in this chamber, which acts on shoulder 55, will now decrease below the pressure acting on shoulder 54, thus causing these shoulders to produce a net pressure force that urges the unloading valve 46 to the right against the bias of spring 52. The back pressure in passage 48, and consequently the load on the pump 20, will now decrease.

Energization of solenoid 85 shifts piloting plunger 59 to the right causing groove 69 to interconnect ports 63 and 64, and also causing land 76 to interrupt the vent path between working chamber 44 and exhaust port 49. As described above, interconnection of ports 63 and 64 causes unloading valve 46 to move toward its closed position and increase the back pressure in passage 48. Interruption of the vent path from working chamber 44 unbalances the pressures acting in working chambers 43 and 44 and renders this increased back pressure effective to shift plunger 15 to the left against the bias of centering spring 37 to a position in which lands 31 and 32 close the open-center unloading path, passages 34 and 35 interconnect chambers 17 and 18, and passages 35 and 36 interconnect chambers 22 and 23. The fluid delivered by the pump 20 passes to one side of the controlled motor 10 through chamber 23 and port 23a and the return fluid from the other side of the motor passes to sump 30 through port 18a and chamber 18. As in the previous case, this return flow maintains the back pressure in passage 48. When the solenoid 85 is de-energized, centering spring 84 returns the piloting plunger to its Fig. 2 position, thus causing the unloading valve 46 to move to its minimum back pressure-establishing position and permitting centering spring 37 to return plunger 15 to its neutral position.

An inspection of Fig. 1 will show that since both of the control plungers 14 and 15 are of the hollow plunger three-position open-center type, the piloting mechanism could be applied to the plunger 14 simply by removing the plunger-bore seals 89 and 91 and the fork at the right end of the plunger, and by installing the sealed caps 41 and 42. This simple conversion feature is desirable in connection with multi-plunger control valves because it permits any one or group of the plungers to be operated from a remote position.

As stated previously, the drawings and description relate only to a preferred embodiment of the invention. Since many changes can be made in the structure of this embodiment without departing from the inventive concept, the following claims should provide the sole measure of the scope of the invention.

What is claimed is:

1. In an hydraulic control system for a double-acting motor, including a three-position open-center control valve having inlet and exhaust ports connected by inlet and exhaust passages with a pump and sump, respectively, two motor ports connected with opposite sides of the double-acting motor, and a movable valve member for controlling communication between these ports, the combination of a centering spring biasing the movable valve member to its open-center position; two opposed piloted pressure motors connected with the valve member, each motor having a working chamber and a movable element subject to the pressure in that chamber and connected with the valve member; an unloading valve controlling flow through the exhaust passage and being shiftable in passage-opening and passage-closing directions; two restricted passages providing parallel flow paths between points in the exhaust passage located upstream and downstream of the unloading valve, one of these restricted passages being connected with the working chamber of each piloted pressure motor; two pilot valves, one located in each restricted passage and each being shiftable between passage-opening and passage-closing positions, both pilot valves normally being in the same position; and means interconnecting the pilot valves and the unloading valve for selectively shifting one of the pilot valves to its other position and for simultaneously shifting the unloading valve in the passage-closing direction.

2. In an hydraulic control system for a double-acting motor, including a three-position open-center control valve having inlet and exhaust ports connected by inlet and exhaust passages with a pump and sump, respectively, two motor ports connected with opposite sides of the double-acting motor, and a movable valve member for controlling communication between these ports, the combination of a centering spring biasing the movable valve member to its open-center position; two opposed piloted pressure motors connected with the valve member, each motor having a working chamber and a movable element subject to the pressure in that chamber and connected with the valve member; an unloading valve controlling flow through the exhaust passage and being shiftable in passage-opening and passage-closing directions; a spring biasing the unloading valve in the passage-closing direction; first means responsive to the pressure in the exhaust passage upstream of the unloading valve for urging the unloading valve in the passage-opening direction; second pressure responsive means urging the unloading valve in the opposite direction; two restricted passages providing parallel flow paths between points in the exhaust passage located upstream and downstream of the unloading valve, one of these restricted passages being connected with the working chamber of each piloted pressure motor; two pilot valves, one located in each restricted passage and each being shiftable between passage-opening and passage-closing positions, both pilot valves normally being in the same position; piloting means for selectively subjecting the second pressure responsive means to the pressure in the exhaust passage upstream or downstream of the unloading valve; and actuating means interconnecting the pilot valves and the piloting means for selectively shifting one of the pilot valves to its other position and for simultaneously causing the piloting means to subject the second pressure responsive means to the pressure upstream of the unloading valve.

3. The combination defined in claim 2 in which each pilot valve is located between the connection of its restricted passage with the working chamber and the connection of this passage with the exhaust passage downstream of the unloading valve; and in which both pilot valves are normally in the passage-opening position.

References Cited in the file of this patent
UNITED STATES PATENTS

| | | |
|---|---|---|
| 2,359,802 | Stephens | Oct. 10, 1944 |
| 2,362,945 | Stephens | Nov. 14, 1944 |
| 2,605,108 | Stephens | July 29, 1952 |
| 2,651,324 | Hodgson et al. | Sept. 8, 1953 |